A. SEMMENDINGER.
Photographic Apparatus.
No. 27,241.
Patented Feb. 21, 1860.
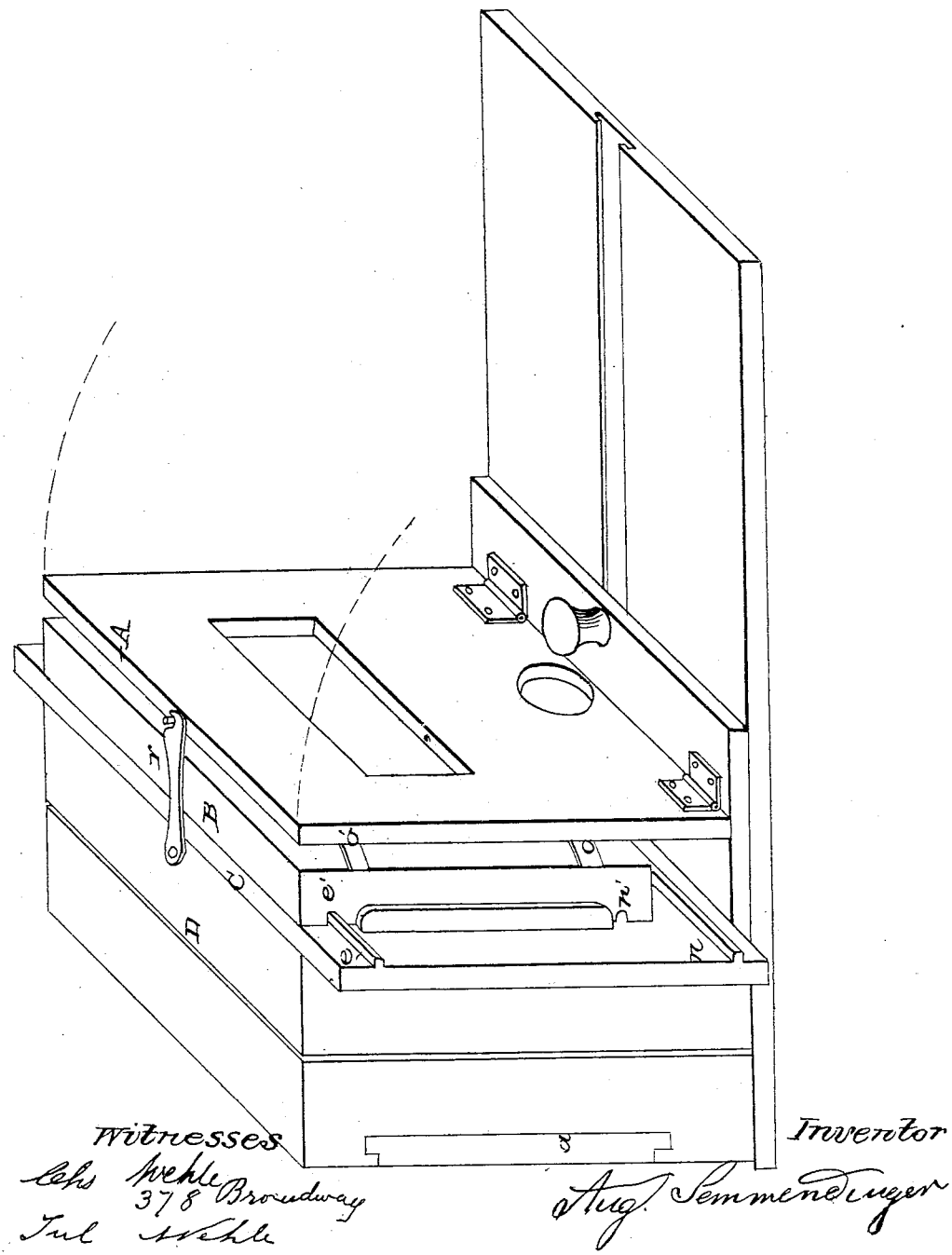

UNITED STATES PATENT OFFICE.

AUGUST SEMMENDINGER, OF NEW YORK, N. Y.

PHOTOGRAPHIC CAMERA.

Specification of Letters Patent No. 27,241, dated February 21, 1860.

*To all whom it may concern:*

Be it known that I, AUGUST SEMMEN-DINGER, of the city, county, and State of New York, have invented a new and Improved Photographic Apparatus; and I hereby declare the following to be a full and exact description thereof, reference being had to the annexed drawing, making part of this specification and representing an isometrical projection of my improved instrument.

The nature of my invention consists in combining a spring board with the usual photographic apparatus for the purpose of facilitating the sliding operation of the glass holder or other holder on which the picture is to be taken, and also in providing the said glass holder with double grooves and the light diminishing board with double tongues; both improvements being introduced for the purpose of facilitating a rapid multiplication in photographing.

To enable others skilled in the art to make and use my invention I will proceed to describe its construction and operation.

A represents the spring board having two springs $o$ and $o'$ attached; it is hinged on the base by two hinges as shown in the drawing, and is fastened on the top to the camera box D by the slide fastening $r$ in such a manner that when the said fastening is opened the spring board may be turned downward as indicated by the dotted lines.

B represents the glass holder or other holder of the material on which the pictures are to be taken.

C represents the light diminishing board it containing a circular opening (or for stereoscopic instruments two circular openings) for concentrating the light of the tubes.

D represents the camera box.

It will be observed that the glass holder B contains two longitudinal grooves $e'$ and $n'$, and that the board C contains two longitudinal tongues $e$ and $n$ so arranged that one of the tongues may fit into one of the grooves and thereby sustain the glass holder either in an upper position as shown in the drawing or in the lower position, which it would hold when the lower groove would rest on the lower tongue.

In order to take pictures with this instrument I proceed in the following manner: I first find the focus in the usual manner. I then remove the ground glass and insert the glass holder containing the prepared glass. I then place the glass holder in the lower position when the groove $n'$ fits the tongue $n$, and is on the front flush with the light board C. I then draw out the slide of the camera $a$ and take two photographic pictures, supposing the apparatus to be a stereoscopic one. I then shove the picture holder C in such a manner that its center should correspond with the center of the box, and when in this position I take two more pictures; I then slide the picture holder in such a manner that its rear should be flush with the rear of the camera box, and in this position I take two more pictures. I then close the slide $a$, I draw out the glass holder entirely and place the same in its upper position, the upper tongue fitting into the upper groove. I then remove the slides again and repeat the operation the same as in the lower position. In this manner two rows of photographic pictures may be obtained, without necessitating the turning of the glass holder.

The springs $o'$ and $o$ of the spring board are placed thereon in such a manner that a slight pressure is exerted on the picture holder, but not sufficient to prevent the sliding of the same. The advantage of this construction consists in the greater ease and rapidity of multiplying photographic pictures.

What I claim as new and desire to secure by Letters Patent is—

The spring board A in combination with a photographic apparatus in the manner and for the purpose substantially as described also the double grooves $e'$ and $n'$ and the double tongues $e$ and $n$ in combination with the glass holder B substantially in the manner and for the purpose set forth.

AUG. SEMMENDINGER.

Witnesses:
CHARLES WEHLE,
JUL. WEHLE.